US012754082B2

(12) United States Patent
Franco et al.

(10) Patent No.: US 12,754,082 B2
(45) Date of Patent: Oct. 6, 2026

(54) ARCHITECTURE FOR PIEZORESISTIVE PRESSURE SENSOR DRIVERS AND POWER MANAGEMENT

(71) Applicant: STMicroelectronics International N.V., Geneva (CH)

(72) Inventors: Pasquale Franco, Catania (IT); Tiziano Chiarillo, Mascalucia (IT); Giovanni Cali', Catania (IT)

(73) Assignee: STMicroelectronics International N.V., Geneva (CH)

( * ) Notice: Subject to any disclaimer, the term of this patent is extended or adjusted under 35 U.S.C. 154(b) by 278 days.

(21) Appl. No.: 18/631,392

(22) Filed: Apr. 10, 2024

(65) Prior Publication Data

US 2025/0321148 A1 Oct. 16, 2025

(51) Int. Cl.
*G01L 1/18* (2006.01)

(52) U.S. Cl.
CPC .................................... *G01L 1/18* (2013.01)

(58) Field of Classification Search
CPC ... G01L 1/18; G01L 9/025; G01L 1/00; G01L 9/00; G01L 9/045; G01L 9/06; G01L 9/065; G01K 1/26; G01K 7/16; H03K 19/017545; H03M 1/16
See application file for complete search history.

(56) References Cited

U.S. PATENT DOCUMENTS 4,765,188 A * 8/1988 Krechmery ............. G01L 9/065 338/3
8,456,160 B2 * 6/2013 Cantave ............... G01R 33/072 324/252
8,918,257 B2 12/2014 Kanzaki et al.
9,641,103 B2 5/2017 Gutierrez et al.
(Continued)

FOREIGN PATENT DOCUMENTS

CN 109668674 B 10/2023
EP 4253928 A1 * 10/2023 ............ G01L 9/045

OTHER PUBLICATIONS

EP Search Report for counterpart, EP Appl. No. 25165411.7, report dated Sep. 19, 2025, 6 pgs.

*Primary Examiner* — Octavia Hollington
(74) *Attorney, Agent, or Firm* — Crowe & Dunlevy LLC

(57) ABSTRACT

A MEMS pressure sensor includes a multiplexer passing a first-voltage or a second-voltage as output, an analog front-end (AFE) conditioning the output of the multiplexer to produce an ADC input, an analog-to-digital converter (ADC) digitizing the ADC input to produce an ADC output, a first Wheatstone-bridge sensitive to pressure and generating the first-voltage based upon the sensed pressure, a second Wheatstone-bridge sensitive to temperature generating the second-voltage based upon the sensed temperature, a voltage regulator using the first Wheatstone-bridge or the second Wheatstone-bridge in a feedback resistive-divider to generate a regulated-voltage, and control circuitry causing the voltage regulator to use the first Wheatstone-bridge
(Continued)

during a pressure sensing period, and causing the voltage regulator to use the second Wheatstone-bridge during a temperature sensing period. The AFE and ADC are powered by the regulated-voltage, and the AFE and ADC use a feedback-voltage generated by the feedback resistive-divider as a reference-voltage.

17 Claims, 5 Drawing Sheets

(56) References Cited

U.S. PATENT DOCUMENTS

| | | | | |
|---|---|---|---|---|
| 10,900,849 | B2 * | 1/2021 | Smerzi | G01L 1/2287 |
| 11,385,109 | B2 | 7/2022 | Wang et al. | |
| 11,422,044 | B2 | 8/2022 | Zamprogno et al. | |
| 12,135,249 | B2 * | 11/2024 | Stary | H03F 1/3211 |
| 2013/0215931 | A1 * | 8/2013 | Vaiana | G01L 19/0092 374/178 |
| 2022/0381635 | A1 * | 12/2022 | Wiesbauer | G01L 9/025 |

* cited by examiner

ARCHITECTURE FOR PIEZORESISTIVE PRESSURE SENSOR DRIVERS AND POWER MANAGEMENT

TECHNICAL FIELD

This disclosure is related to the field of micro-electromechanical systems (MEMS) based pressure sensors and, in particular, to a MEMS pressure sensor design that provides for reduced silicon area usage and reduced power consumption.

BACKGROUND

MEMS pressure sensors output either differential voltages or small capacitance changes, depending on whether they are piezo-sensors (PPS) or capacitive-sensors (CPS). An analog processing chain processes these small outputs, amplifying and converting them into usable signals, such as may be read by a digital signal processor (DSP). These sensors, used across consumer and industrial sectors within a −40° C. to 125° C. temperature range, require digital temperature compensation for accurate pressure readings, yet there is also an ever-increasing desire to reduce the silicon area occupied by these sensors and their analog processing chains, as well as to reduce the power consumed by the analog processing chains.

A known MEMS pressure sensor circuit 10 is now described with reference to FIG. 1. The MEMS pressure sensor circuit 10 includes a first Wheatstone bridge 11 of piezo resistors Rp1, Rp2, Rp1', Rp2' configured for pressure sensing and a second Wheatstone bridge 12 of resistors Rt1, Rt2, Rt1', Rt2' configured for temperature sensing, with the sensed temperature being used for temperature compensation of the pressure readings. A first amplifier 21 sets the voltage at a top of the first Wheatstone bridge 11 to equal a first reference voltage VREF1, and a second amplifier 31 drives the second Wheatstone bridge 12 with a current set by a second reference voltage VREF2 and a resistor $R_{die}$, which is inside the ASIC. This type of "current" driving is preferable to a "voltage" type due to lower nonlinearity coefficients of order higher than the second one. A multiplexer 14 receives an output voltage ΔVP representative of pressure experienced by the first Wheatstone bridge 12 and an output voltage ΔVT representative of temperature experienced by the second Wheatstone bridge 12 and selectively provides either ΔVP or ΔVT to an analog front end 15, which processes the received signal for digitization by an analog-to-digital converter (ADC) 16. The ADC 16 produces a digital output OUT for reading by a DSP (not explicitly shown). A voltage regulator arrangement formed by amplifier 13 and resistors R1, R2 generates a regulated voltage VREG used for supplying the AFE 15 and ADC 16, while the reference voltage used by the ADC 16 in its digitization is VREF1.

When the multiplexer 14 selects ΔVP for passage to its output, the reference voltage VREF1 utilized by the ADC 16 is equal to the voltage used to drive the first Wheatstone bridge 11. When the multiplexer 14 selects ΔVT for passage to its output however, the reference voltage VREF1 utilized by the ADC 16 is not physically equal to the voltage used to drive the second Wheatstone bridge 12, potentially leading to the temperature ADC conversions being subjected to any (not compensated) disturbances and low frequency noise coming from the bridge driving and hence being less accurate. In addition, the use of three separate amplifiers 13, 21, 31 consumes more semiconductor area than desirable and consumes more power than desirable. Given these drawbacks, further development is necessary.

SUMMARY

Disclosed herein is a MEMS pressure sensor circuit, including: a multiplexer configured to pass either a first voltage or a second voltage as an output; an analog front end (AFE) configured to condition the output of the multiplexer to produce an ADC input; an analog-to-digital converter (ADC) configured to digitize the ADC input to produce an ADC output; a first Wheatstone bridge sensitive to pressure and configured to sense pressure applied thereto and generate the first voltage based upon the sensed pressure; a second Wheatstone bridge sensitive to temperature and configured to sense temperature applied thereto and generate the second voltage based upon the sensed temperature; a voltage regulator arrangement configured to selectively use either the first Wheatstone bridge or the second Wheatstone bridge in a feedback resistive divider to generate a regulated voltage; and control circuitry configured to cause the voltage regulator arrangement to use the first Wheatstone bridge in the feedback resistive divider during a pressure sensing period, and to cause the voltage regulator arrangement to use the second Wheatstone bridge in the feedback resistive divider during a temperature sensing period; wherein the AFE and ADC are powered by the regulated voltage, and wherein the AFE and ADC use a feedback voltage generated by the feedback resistive divider as a reference voltage.

The voltage regulator arrangement may include: switch circuitry; and an amplifier having a first input coupled to receive a reference voltage and a second input selectively coupleable by the switch circuitry to a top of the first Wheatstone bridge so that the feedback resistive divider is formed by a series combination of a first trimmable resistor and the first Wheatstone bridge during the pressure sensing period or to a top of the second Wheatstone bridge so that the feedback resistive divider is formed by a series combination of a second trimmable resistor and the second Wheatstone bridge during the temperature sensing period, wherein the regulated voltage is generated at an output of the amplifier.

The switch circuitry may include: a first switch coupled between the output of the amplifier and the first trimmable resistor; a second switch coupled between the output of the amplifier and the second trimmable resistor; a third switch coupled between the second input of the amplifier and the top of the first Wheatstone bridge; and a fourth switch coupled between the second input of the amplifier and the top of the second Wheatstone bridge.

The switch circuitry may also include a fifth switch coupled between the second input of the amplifier and a dummy resistor, the dummy resistor being coupled between the fifth switch and ground.

The first Wheatstone bridge may include p+ implant resistors, and the first trimmable resistor may be a diffusion resistor having a thermal coefficient that is substantially equal to the thermal coefficient of the p+ resistors forming the first Wheatstone bridge.

The second Wheatstone bridge may include a pair of polysilicon resistors and pair of p+ implant resistors, and the second trimmable resistor may be a polysilicon resistor having a thermal coefficient that is substantially equal to the thermal coefficient of the resistors forming the second Wheatstone bridge.

The first Wheatstone bridge may include p+ implant resistors, and the first trimmable resistor may be a diffusion resistor having a thermal coefficient that is substantially equal to a thermal coefficient of the p+ implant resistors forming the first Wheatstone bridge.

The second Wheatstone bridge may include a pair of polysilicon resistors and pair of p+ implant resistors, and the second trimmable resistor may be a polysilicon resistor having a thermal coefficient that is substantially equal to a thermal coefficient of the polysilicon resistors and the p+ implant resistors forming the second Wheatstone bridge.

The first trimmable resistor may be a diffusion resistor having a thermal coefficient that is substantially equal to a thermal coefficient of resistors forming the first Wheatstone bridge.

The second trimmable resistor may be a polysilicon resistor having a thermal coefficient that is substantially equal to a thermal coefficient of resistors forming the second Wheatstone bridge.

Also disclosed herein is a MEMS pressure sensor circuit, including: a multiplexer configured to pass either a first voltage or a second voltage at its output; an analog front end (AFE) configured to condition the output of the multiplexer to produce an ADC input; an analog-to-digital converter (ADC) configured to digitize the ADC input to produce an ADC output; a first Wheatstone bridge sensitive to pressure and configured to sense pressure applied thereto and generate the first voltage based upon the sensed pressure; a second Wheatstone bridge sensitive to temperature and configured to sense temperature applied thereto and generate the second voltage based upon the sensed temperature; and a voltage regulator arrangement.

The voltage regulator arrangement includes: switch circuitry; and an amplifier having a first input coupled to receive a reference voltage and a second input selectively couplable by the switch circuitry to a top of the first Wheatstone bridge so that a first feedback resistive divider is formed by a series combination of a first trimmable resistor and the first Wheatstone bridge during a pressure sensing period or to a top of the second Wheatstone bridge so that a second feedback resistive divider is formed by a series combination of a second trimmable resistor and the second Wheatstone bridge during a temperature sensing period, wherein a regulated voltage is generated at an output of the amplifier. Control circuitry is configured to control the switch circuitry to cause the voltage regulator arrangement to use the first Wheatstone bridge in the first feedback resistive divider to generate the regulated voltage during the pressure sensing period, and to cause the voltage regulator arrangement to use the second Wheatstone bridge in the second feedback resistive divider to generate the regulated voltage during the temperature sensing period.

The AFE and ADC are powered by the regulated voltage, and the AFE and ADC use a feedback voltage generated by the first feedback resistive divider as a reference voltage during the pressure sensing period and use a feedback voltage generated by the second feedback resistive divider as a reference voltage during the pressure sensing period.

The switch circuitry may include: a first switch coupled between the output of the amplifier and the first trimmable resistor; a second switch coupled between the output of the amplifier and the second trimmable resistor; a third switch coupled between the second input of the amplifier and the top of the first Wheatstone bridge; and a fourth switch coupled between the second input of the amplifier and the top of the second Wheatstone bridge.

The switch circuitry may also include a fifth switch coupled between the second input of the amplifier and a dummy resistor, the dummy resistor being coupled between the fifth switch and ground.

The first Wheatstone bridge may include p+ implant resistors, and wherein the first trimmable resistor is a diffusion resistor having a thermal coefficient that is substantially equal to a thermal coefficient of the p+ implant resistors.

The second Wheatstone bridge may include a pair of polysilicon resistors and pair of p+ resistors, and wherein the second trimmable resistor is a poly resistor having a thermal coefficient that is substantially equal to a thermal coefficient of the p+ resistors and the polysilicon resistors forming the second Wheatstone bridge.

The first trimmable resistor may be a diffusion resistor having a thermal coefficient that is substantially equal to a thermal coefficient of resistors forming the first Wheatstone bridge.

The second trimmable resistor may be a polysilicon resistor having a thermal coefficient that is substantially equal to a thermal coefficient of resistors forming the second Wheatstone bridge.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Figure 1:
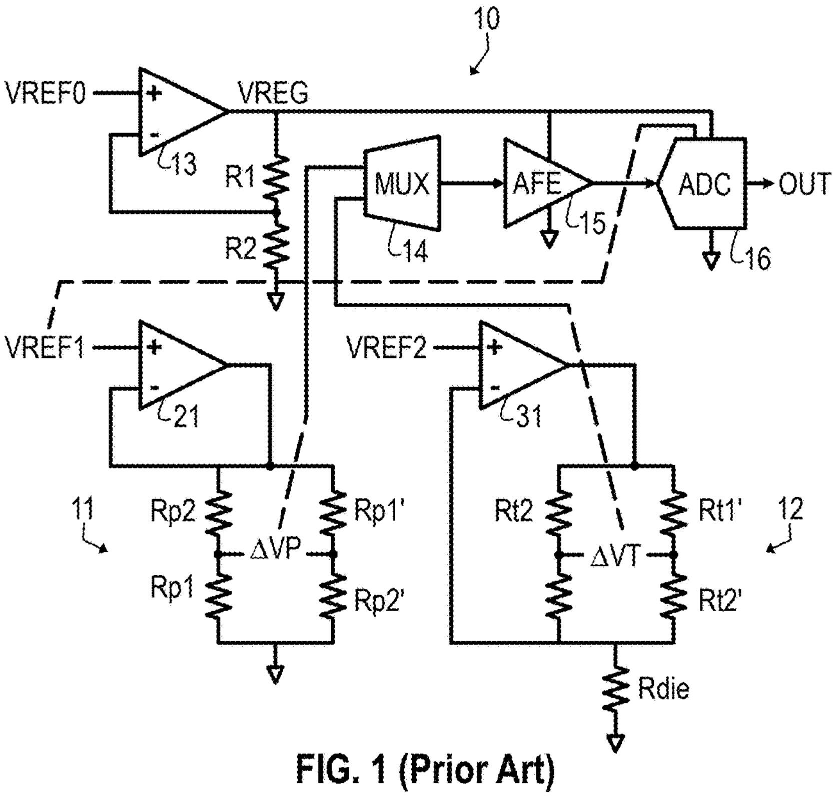
FIG. 1 (Prior Art)
FIG. 1 is a schematic block diagram of a prior art MEMS pressure sensor circuit.
Figure 2:
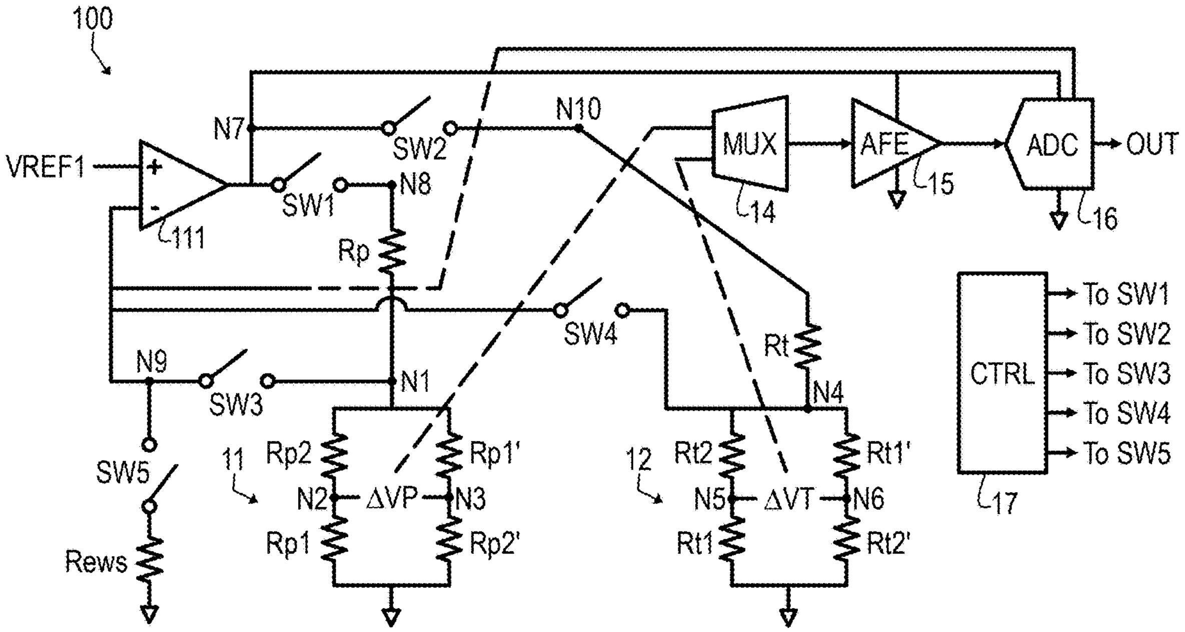
FIG. 2 is a schematic block diagram of a MEMS pressure sensor circuit disclosed herein.

Now described with reference to FIG. 2 is a MEMS pressure sensor circuit 100. First, the circuit layout of the MEMS pressure sensor circuit 100 will be described, and thereafter the operation of the MEMS pressure sensor circuit 100 will be described.

The first Wheatstone bridge 11 includes piezoresistor Rp2 connected between nodes N1 and N2, piezoresistor Rp1 connected between nodes N2 and ground, piezoresistor Rp1' connected between nodes N1 and N3, and piezoereistor Rp2' connected between nodes N3 and ground; Rp2, Rp1, Rp1', Rp2' are p+ implant resistors. A trimming resistor Rp is connected between nodes N1 and N8, and is a diffusion resistor chosen to have its thermal coefficient ($1.3\times10^{-3}$ 1/° C.) be substantially equal to the thermal coefficients ($1.25\times10^{-3}$ 1/° C.) of resistors Rp2, Rp1, Rp1', Rp2'. An output voltage ΔVP representative of pressure experienced by the first Wheatstone bridge 12 is formed across nodes N2 and N3.

An amplifier 111 has its non-inverting input coupled to receive a first reference voltage VREF1 (e.g., generated by a bandgap voltage generator), its inverting input connected to node N9, and its output connected to node N7. A switch SW1 is connected between nodes N7 and N8, a switch SW3 is connected between nodes N1 and N9, a switch SW5 is connected between node N9 and resistor Rews, and resistor Rews is connected between switch SW5 and ground. Resistor Rews is (herein) a diffusion resistor (for reasons that will be explained below).

Wheatstone bridge 12 includes resistor Rt2 connected between nodes N4 and N5, resistor Rt1 connected between nodes N5 and ground, resistor Rt1' connected between nodes N4 and N6, and resistor Rt2' connected between nodes N6 and ground; Rt1, Rt1' are polysilicon resistors while Rt2, Rt2' are p+ resistors. A trimming resistor Rt is connected between nodes N4 and N10, and is a poly resistor chosen to have its thermal coefficient ($-0.09\times10^{-3}$ 1/° C.) equal to the thermal coefficients (0 1/° C.) of resistors Rt2, Rt1, Rt1', Rt2'. An output voltage ΔVT representative of pressure experienced by the second Wheatstone bridge 12 is formed across nodes N5 and N6.

A multiplexer 14 receives the output voltage ΔVP and the output voltage ΔVT, and selectively provides either ΔVP or ΔVT to an analog front end (AFE) 15, which processes the received signal for digitization by an analog-to-digital converter (ADC) 16. The ADC 16 produces a digital output OUT for reading by a DSP (not explicitly shown). The AFE 15 and ADC 16 are supplied by the output of amplifier 111, and utilize the voltage at the inverting input of amplifier 111 (node N9) as a reference voltage.

Switches SW1, SW2, SW3, SW4, SW5 are controlled by control circuitry (CTRL) 17 to perform the operation described herein.

In general, during operation, through proper switching of switches SW1, SW2, SW3, SW4, SW5, time division multiplexing is used for the output OUT of the ADC 16 represent digitized versions of ΔVP and ΔVT at different times, while proper switching of switches SW1, SW2, SW3, SW4, SW5 alternatingly sets the first Wheatstone bridge 11 and second Wheatstone bridge 12 to be used in a divider with Rp or Rt, respectively, for regulation of the voltage at nodes N1 and N4 to be equal to VREF1.

Figure 3:
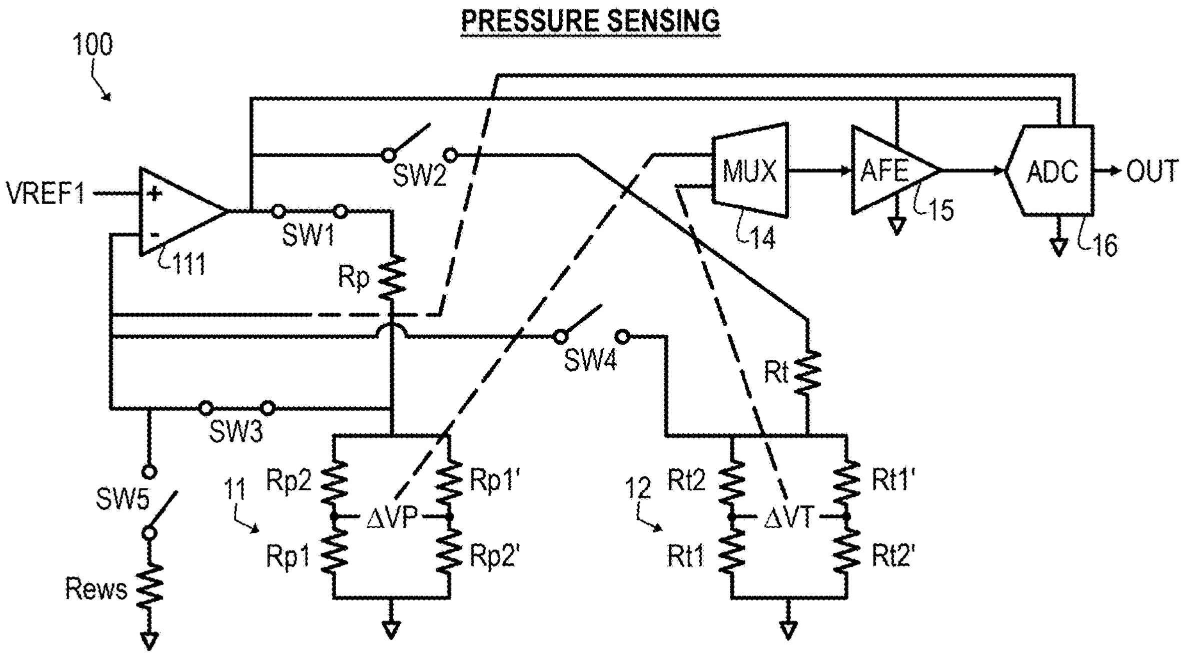
FIG. 3 shows the MEMS pressure sensor circuit of FIG. 2 when switched to operate to perform pressure sensing.

Pressure sensing is now described in detail with reference to FIG. 3. To perform pressure sensing, switches SW1 and SW3 are closed, while switches SW2, SW4, and SW5 are opened. This sets the resistor Rp to be connected in series with the first Wheatstone bridge 11 between the output of amplifier 111 and ground, with the tap (node N1) between resistor Rp and the first Wheatstone bridge 11 being connected to the inverting input of amplifier 111. The amplifier 111 performs voltage regulation here, setting the voltage at the tap (node N1) as being equal to the reference voltage VREF1. During pressure sensing therefore, the output OUT of the ADC 14 is a digitized version of ΔVP.

Figure 4:
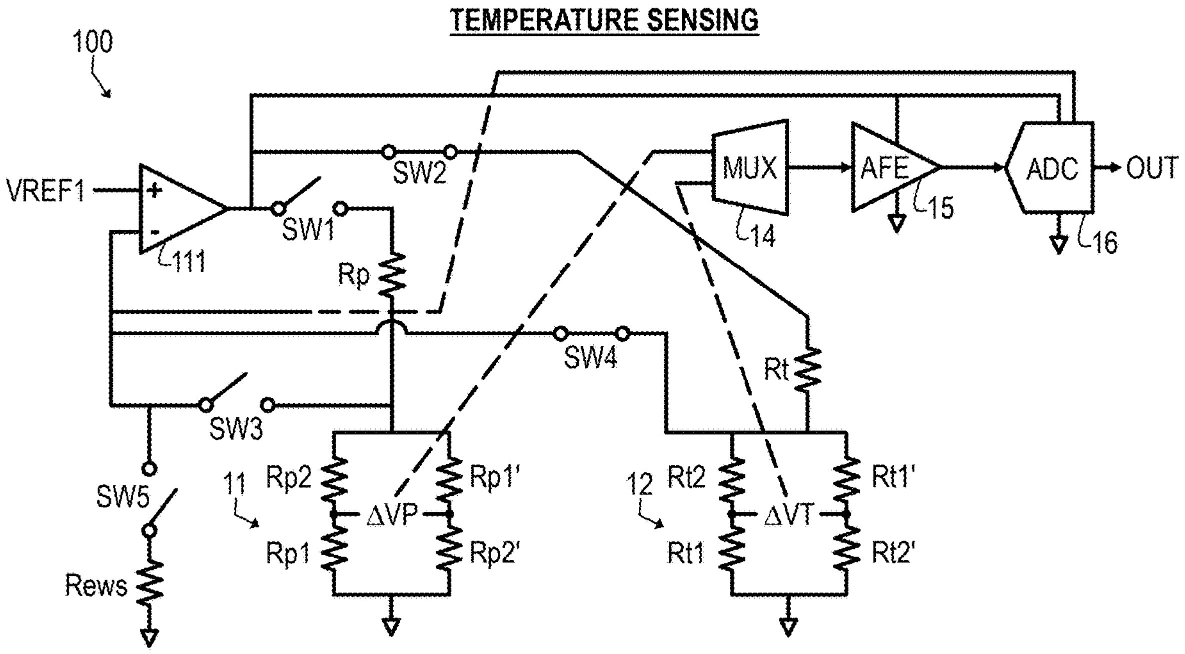
FIG. 4 shows the MEMS pressure sensor circuit of FIG. 2 when switched to operate to perform temperature sensing.

Temperature measurement is now described in detail with reference to FIG. 4. To perform temperature sensing, switches SW2 and SW4 are closed, while switched SW1, SW3, and SW5 are opened. This sets the resistor Rt to be connected in series with the second Wheatstone bridge 12 between the output of amplifier 111 and ground, with the tap (node N4) between resistor Rt and the second Wheatstone bridge 12 being connected to the inverting input of amplifier 111. The amplifier 111 performs voltage regulation here, setting the voltage at the tap (node N4) as being equal to the reference voltage VREF1. During pressure sensing therefore, the output OUT of the ADC 14 is a digitized version of ΔVT, which may be also used to compensate ΔVP for temperature.

Figure 5:
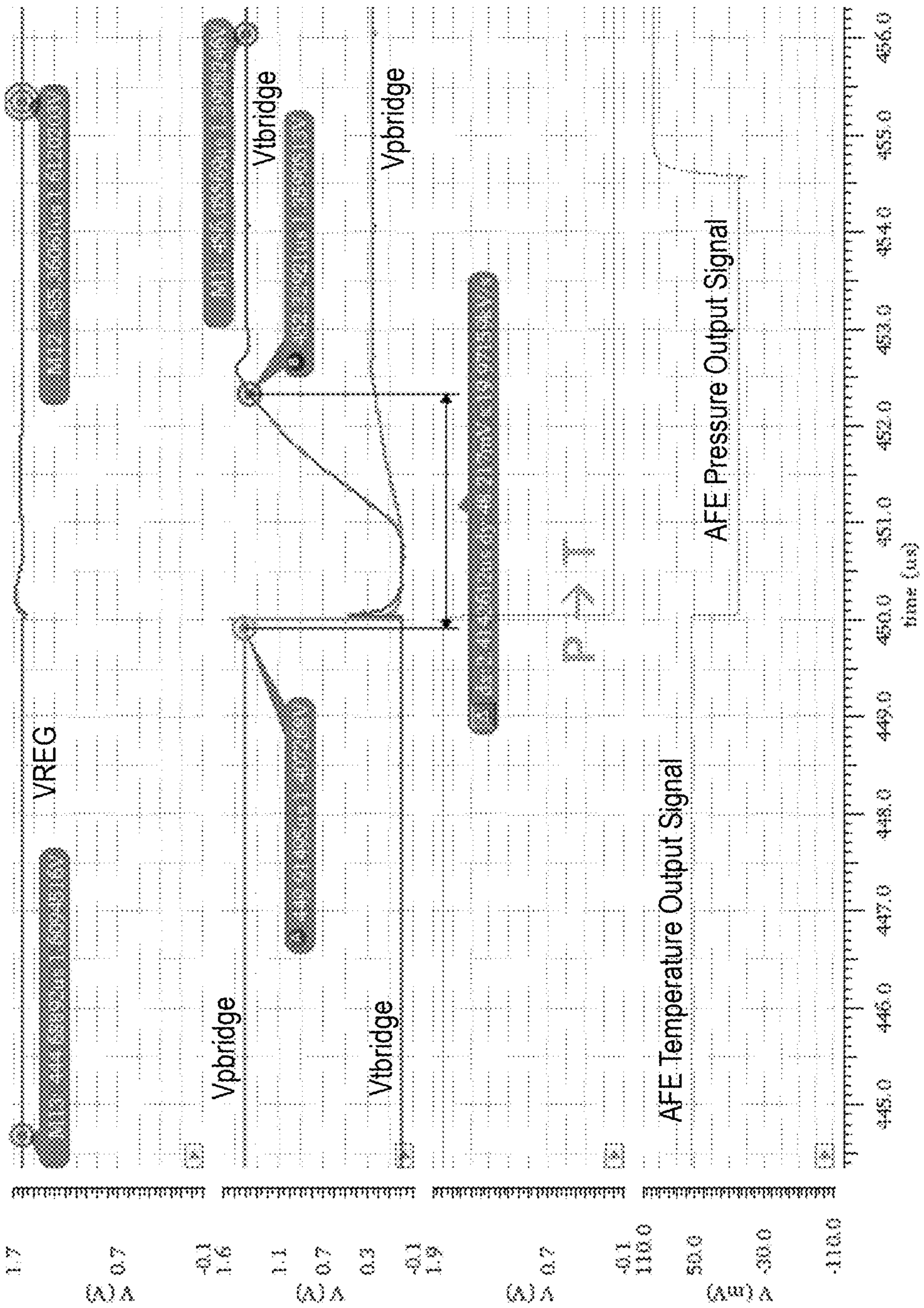
FIG. 5 (Prior Art)
FIG. 5 shows waveforms of voltages of the prior art MEMS pressure sensor circuit of FIG. 1 when switching from pressure to temperature sensing.
Figure 6:
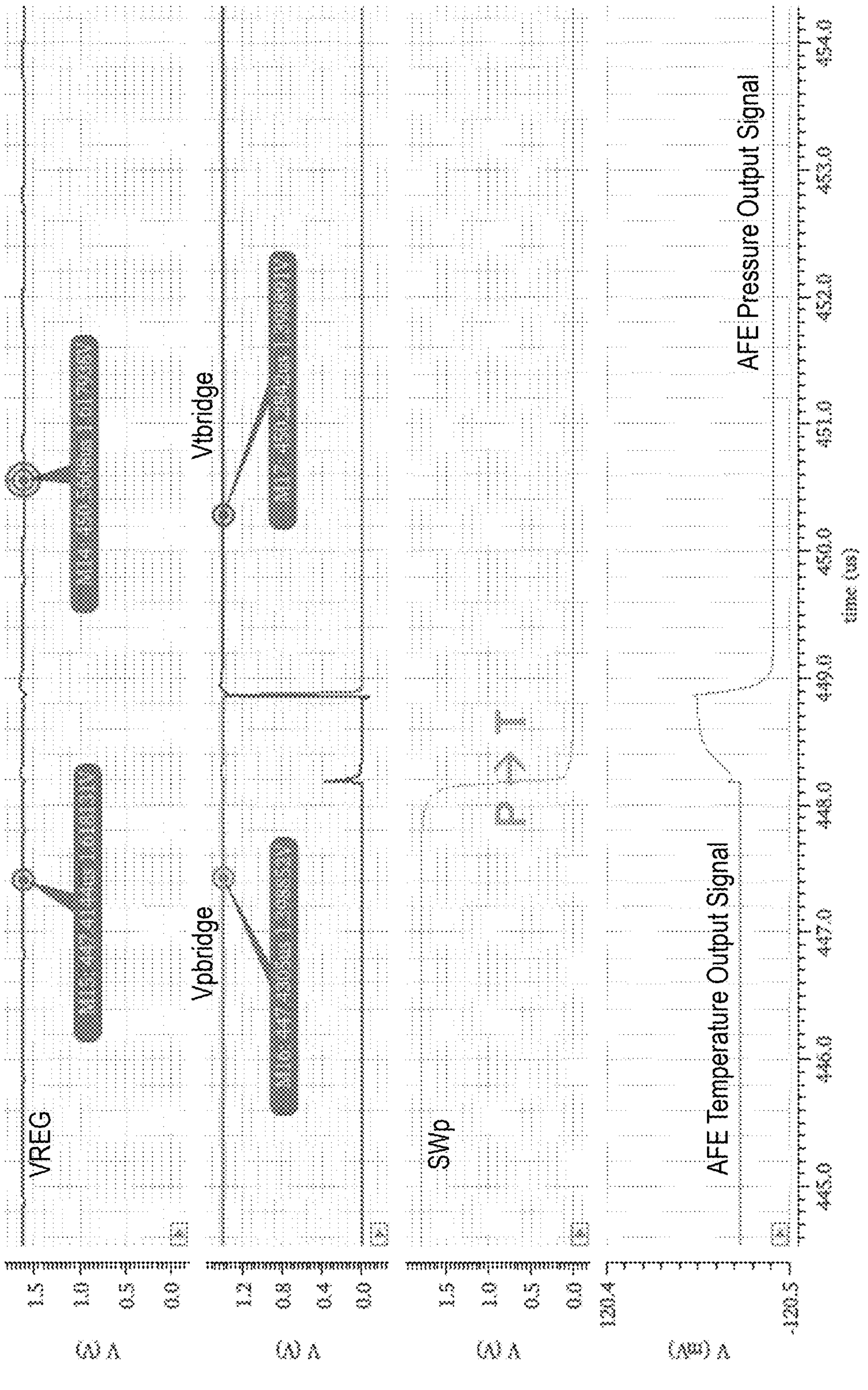
FIG. 6 shows waveforms of voltages of the MEMS pressure sensor circuit of FIG. 2 when switching from pressure to temperature sensing.

With this design, the reference voltage utilized by the ADC 16 (the voltage at the inverting input of amplifier 111, node N9) is equal to the voltage utilized to supply currently selected Wheatstone bridge (whether pressure 11 or temperature 12)—this voltage is equal to VREF1 due to the regulation performed by the amplifier 111. This avoids the concern with the prior art where the reference voltage utilized by the ADC 16 is not physically equal to the voltage used to drive the currently selected Wheatstone bridge 12 during the temperature measurement (during this phase it is just electrically equal to the drive voltage). Another benefit provided by this design is a reduced switching time (between temperature and pressure sensing cycles) over the prior art-observe the switching time for the prior art design in FIG. 5 as being 2.4 μs, but for the MEMS pressure sensor circuit 100 in FIG. 6 as being 30 ns. Still further, the design of the MEMS pressure sensor circuit 100 utilizes one amplifier 111 as opposed to the three amplifiers of the prior art, saving a substantial amount of area (on the order of 30%) and reducing power consumption considerably (on the order of 70%).

In certain instances, it may be desired to perform voltage regulation with the Wheatstone bridges 11, 12 being not present or disconnected. To achieve this, two configurations are possible.

Figure 7:
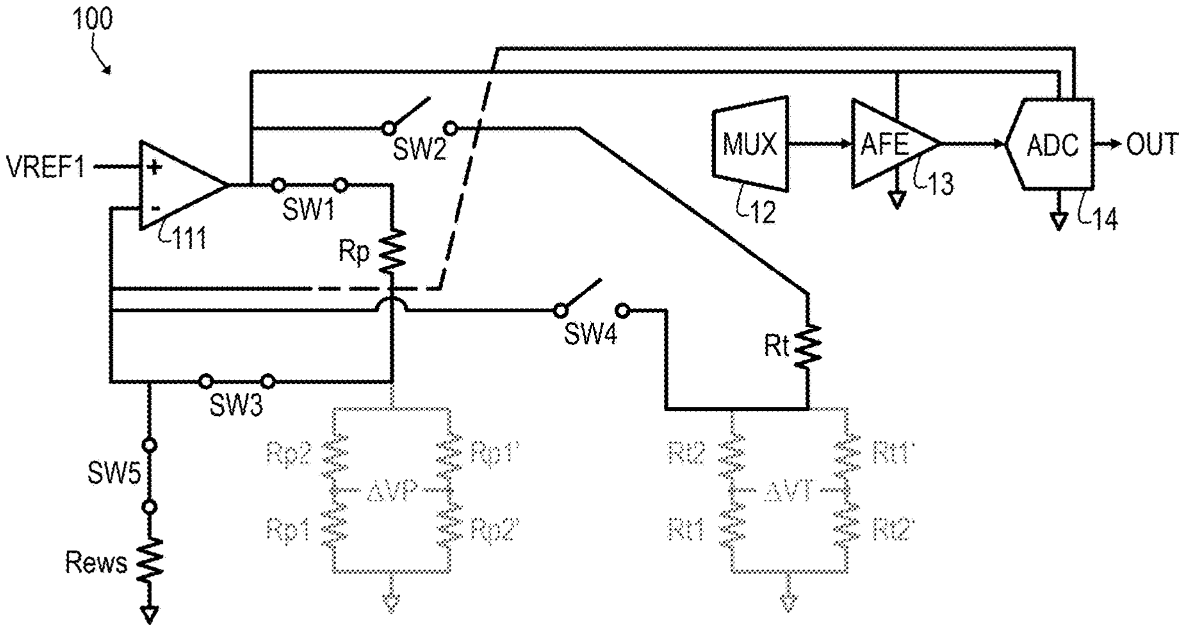
FIG. 7 shows the MEMS pressure sensor circuit of FIG. 2, with the Wheatstone bridges removed, in a first configuration to perform voltage regulation.

In the first configuration, shown in FIG. 7, switches SW2 and SW4 are opened while switches SW1 and SW5 are closed. Thus, here, resistors Rp and Rews are connected in series between the output of amplifier 111 and ground, with the tap (node N1) between resistors Rp and Rews being connected to the inverting input of amplifier 111. The amplifier 111 performs voltage regulation here, setting the voltage at the tap (node N1) as being equal to the reference voltage VREF1.

Figure 8:
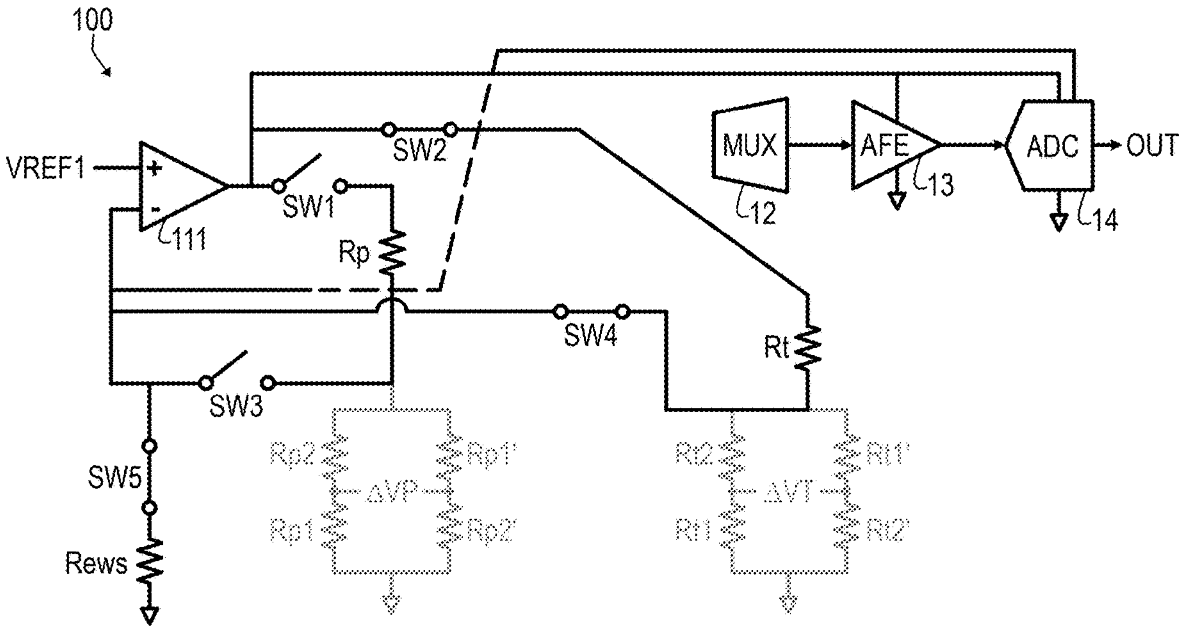
FIG. 8 shows the MEMS pressure sensor circuit of FIG. 2, with the Wheatstone bridges removed, in a second configuration to perform voltage regulation.

In the second configuration, shown in FIG. 8, switches SW2, SW4, and SW5 are closed while switches SW1 and SW3 are opened. Thus, here, resistors Rt and Rews are connected in series between the output of amplifier 111 and ground, with the tap (node N4) between resistors Rt and Rews being connected to the inverting input of amplifier 111. The amplifier 111 performs voltage regulation here, setting the voltage at the tap (node N4) as being equal to the reference voltage VREF1.

The type of the Rews resistor is to be established in advance based on which of the two configurations is chosen: if the first configuration (FIG. 7) is chosen, Rews is of the same type as Rp (diffused), while if the second configuration (FIG. 8) is chosen, Rews is of the same type as Rt (polysilicon).

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A MEMS pressure sensor circuit, comprising:

a multiplexer configured to pass either a first voltage or a second voltage as an output;

an analog front end (AFE) configured to condition the output of the multiplexer to produce an ADC input;

an analog-to-digital converter (ADC) configured to digitize the ADC input to produce an ADC output;

a first Wheatstone bridge sensitive to pressure and configured to sense pressure applied thereto and generate the first voltage based upon the sensed pressure;

a second Wheatstone bridge sensitive to temperature and configured to sense temperature applied thereto and generate the second voltage based upon the sensed temperature;

a voltage regulator arrangement configured to selectively use either the first Wheatstone bridge or the second Wheatstone bridge in a feedback resistive divider to generate a regulated voltage; and control circuitry configured to cause the voltage regulator arrangement to use the first Wheatstone bridge in the feedback resistive divider during a pressure sensing period, and to cause the voltage regulator arrangement to use the second Wheatstone bridge in the feedback resistive divider during a temperature sensing period;

wherein the AFE and ADC are powered by the regulated voltage, and wherein the AFE and ADC use a feedback voltage generated by the feedback resistive divider as a reference voltage.

2. The MEMS pressure sensor circuit of claim 1, wherein the voltage regulator arrangement comprises:

switch circuitry; and an amplifier having a first input coupled to receive a reference voltage and a second input selectively coupleable by the switch circuitry to a top of the first Wheatstone bridge so that the feedback resistive divider is formed by a series combination of a first trimmable resistor and the first Wheatstone bridge during the pressure sensing period or to a top of the second Wheatstone bridge so that the feedback resistive divider is formed by a series combination of a second trimmable resistor and the second Wheatstone bridge during the temperature sensing period, wherein the regulated voltage is generated at an output of the amplifier.

3. The MEMS pressure sensor circuit of claim 2, wherein the switch circuitry comprises:

a first switch coupled between the output of the amplifier and the first trimmable resistor;

a second switch coupled between the output of the amplifier and the second trimmable resistor;

a third switch coupled between the second input of the amplifier and the top of the first Wheatstone bridge; and a fourth switch coupled between the second input of the amplifier and the top of the second Wheatstone bridge.

4. The MEMS pressure sensor circuit of claim 3, wherein the switch circuitry further comprises a fifth switch coupled between the second input of the amplifier and a dummy resistor, the dummy resistor being coupled between the fifth switch and ground.

5. The MEMS pressure sensor circuit of claim 2, wherein the first Wheatstone bridge comprises p+ implant resistors, and wherein the first trimmable resistor comprises a diffusion resistor having a thermal coefficient that is substantially equal to a thermal coefficient of the p+ implant resistors of the first Wheatstone bridge.

6. The MEMS pressure sensor circuit of claim 5, wherein the second Wheatstone bridge comprises a pair of polysilicon resistors and pair of p+ implant resistors, and wherein the second trimmable resistor comprises a polysilicon resistor having a thermal coefficient that is substantially equal to a thermal coefficient of the resistors of the second Wheatstone bridge.

7. The MEMS pressure sensor circuit of claim 5, wherein the first trimmable resistor comprises a diffusion resistor having a thermal coefficient that is substantially equal to a thermal coefficient of resistors forming the first Wheatstone bridge.

8. The MEMS pressure sensor circuit of claim 5, wherein the second trimmable resistor comprises a polysilicon resistor having a thermal coefficient that is substantially equal to a thermal coefficient of resistors forming the second Wheatstone bridge.

9. The MEMS pressure sensor circuit of claim 2, wherein the first Wheatstone bridge comprises p+ implant resistors, and wherein the first trimmable resistor comprises a diffusion resistor having a thermal coefficient that is substantially equal to a thermal coefficient of the p+ implant resistors of the first Wheatstone bridge.

10. The MEMS pressure sensor circuit of claim 9, wherein the second Wheatstone bridge comprises a pair of polysilicon resistors and pair of p+ implant resistors, and wherein the second trimmable resistor comprises a polysilicon resistor having a thermal coefficient that is substantially equal to a thermal coefficient of the polysilicon resistors and the p+ implant resistors of the second Wheatstone bridge.

11. The MEMS pressure sensor circuit of claim 9, wherein the switch circuitry comprises:

a first switch coupled between the output of the amplifier and the first trimmable resistor;

a second switch coupled between the output of the amplifier and the second trimmable resistor;

a third switch coupled between the second input of the amplifier and the top of the first Wheatstone bridge; and a fourth switch coupled between the second input of the amplifier and the top of the second Wheatstone bridge.

12. The MEMS pressure sensor circuit of claim 11, wherein the switch circuitry further comprises a fifth switch coupled between the second input of the amplifier and a dummy resistor, the dummy resistor being coupled between the fifth switch and ground.

13. A MEMS pressure sensor circuit, comprising:

a multiplexer configured to pass either a first voltage or a second voltage at its output;

an analog front end (AFE) configured to condition the output of the multiplexer to produce an ADC input;

an analog-to-digital converter (ADC) configured to digitize the ADC input to produce an ADC output;

a first Wheatstone bridge sensitive to pressure and configured to sense pressure applied thereto and generate the first voltage based upon the sensed pressure;

a second Wheatstone bridge sensitive to temperature and configured to sense temperature applied thereto and generate the second voltage based upon the sensed temperature;

a voltage regulator arrangement comprising:

switch circuitry; and an amplifier having a first input coupled to receive a reference voltage and a second input selectively couplable by the switch circuitry to a top of the first Wheatstone bridge so that a first feedback resistive divider is formed by a series combination of a first trimmable resistor and the first Wheatstone bridge during a pressure sensing period or to a top of the second Wheatstone bridge so that a second feedback resistive divider is formed by a series combination of a second trimmable resistor and the second Wheatstone bridge during a temperature sensing period, wherein a regulated voltage is generated at an output of the amplifier; and control circuitry configured to control the switch circuitry to cause the voltage regulator arrangement to use the first Wheatstone bridge in the first feedback resistive divider to generate the regulated voltage during the pressure sensing period, and to cause the voltage regulator arrangement to use the second Wheatstone bridge in the second feedback resistive divider to generate the regulated voltage during the temperature sensing period;

wherein the AFE and ADC are powered by the regulated voltage, and wherein the AFE and ADC use a feedback voltage generated by the first feedback resistive divider as a reference voltage during the pressure sensing period and use a feedback voltage generated by the second feedback resistive divider as a reference voltage during the pressure sensing period.

14. The MEMS pressure sensor circuit of claim 13, wherein the first Wheatstone bridge comprises p+ implant resistors, and wherein the first trimmable resistor comprises a diffusion resistor having a thermal coefficient that is substantially equal to a thermal coefficient of the p+ implant resistors.

15. The MEMS pressure sensor circuit of claim 14, wherein the second Wheatstone bridge comprises a pair of polysilicon resistors and pair of p+ resistors, and wherein the second trimmable resistor comprises a poly resistor having a thermal coefficient that is substantially equal to a thermal coefficient of the pair of p+ resistors and the pair of polysilicon resistors forming the second Wheatstone bridge.

16. The MEMS pressure sensor circuit of claim 13, wherein the first trimmable resistor comprises a diffusion resistor having a thermal coefficient that is substantially equal to a thermal coefficient of resistors forming the first Wheatstone bridge.

17. The MEMS pressure sensor circuit of claim 13, wherein the second trimmable resistor comprises a polysilicon resistor having a thermal coefficient that is substantially equal to a thermal coefficient of resistors forming the second Wheatstone bridge.

* * * * *